(12) United States Patent
Colville et al.

(10) Patent No.: US 8,416,788 B2
(45) Date of Patent: Apr. 9, 2013

(54) COMPRESSION OF DATA PACKETS WHILE MAINTAINING ENDPOINT-TO-ENDPOINT AUTHENTICATION

(75) Inventors: Scott Colville, Seattle, WA (US); James Pinkerton, Pinkerton, WA (US); Dan Boldo, Bellevue, WA (US); Maxim Stepin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 11/796,078

(22) Filed: Apr. 26, 2007

(65) Prior Publication Data

US 2008/0267217 A1    Oct. 30, 2008

(51) Int. Cl.
*H04L 29/06* (2006.01)

(52) U.S. Cl. ........ 370/398; 370/392; 370/389; 370/349; 370/410; 370/402; 709/247; 709/216; 709/217; 709/246

(58) Field of Classification Search .................. 709/223; 370/474
See application file for complete search history.

(56) References Cited

U.S. PATENT DOCUMENTS

| | | | | |
|---|---|---|---|---|
| 5,481,542 | A * | 1/1996 | Logston et al. | 725/131 |
| 5,602,749 | A * | 2/1997 | Vosburgh | 700/174 |
| 5,684,962 | A | 11/1997 | Black et al. | |
| 6,339,787 | B1 * | 1/2002 | Yohe et al. | 709/217 |
| 6,523,102 | B1 * | 2/2003 | Dye et al. | 711/170 |
| 6,618,397 | B1 * | 9/2003 | Huang | 370/474 |
| 6,834,297 | B1 | 12/2004 | Peiffer et al. | |
| 6,963,570 | B1 | 11/2005 | Agarwal | |
| 7,209,491 | B2 | 4/2007 | Zheng et al. | |
| 7,362,780 | B2 * | 4/2008 | Liu | 370/521 |
| 2002/0058474 | A1 * | 5/2002 | Thompson et al. | 455/3.01 |
| 2003/0065820 | A1 * | 4/2003 | Kramer | 709/247 |
| 2004/0146053 | A1 | 7/2004 | Nabhan et al. | |
| 2004/0170166 | A1 | 9/2004 | Cohen | |
| 2004/0199660 | A1 | 10/2004 | Liu | |
| 2005/0008023 | A1 | 1/2005 | Melhorn | |
| 2006/0184652 | A1 | 8/2006 | Teodosiu et al. | |
| 2007/0211724 | A1 | 9/2007 | Johansson et al. | |

FOREIGN PATENT DOCUMENTS

EP    1418727 A2    5/2004

OTHER PUBLICATIONS

"Expand Networks Accelerators", Date: Apr. 2004, http://www.expand.com/products/WhitePapers/Tech_Overview.pdf.
"Titan II: An IPcomp Processor for 10-Gbps Networks", Date: 2004, http://ieeexplore.ieee.org/iel5/54/29877/01363706.pdf?isNumber=.
"WAN Acceleration Solutions", http://www.silver-peak.com/assets/download/pdf/SilverPeak_ExecutiveGuide_InfoWorld_200611.pdf.
International Search Report and Written Opinion for PCT Application No. PCT/US2008/058138.

* cited by examiner

*Primary Examiner* — Asad Nawaz
*Assistant Examiner* — Jason Harley (57) ABSTRACT

Contiguous data packets of a single communication session between endpoints are gathered for compression, and at least the payloads are compressed collectively via a single compressible buffer. The original headers, which may or may not be compressed, and the compressed payloads are transmitted from a sending packet compression device to a receiving packet compression device that performs decompression to the compressed payload and may also decompress headers if they have been compressed at the sending end. The original contiguous data packets including headers and payload may be reconstructed at the receiving packet compression device by matching the headers to the corresponding payloads. The reconstructed data packets are injected back into the single communication session, and the presence of the original headers in the reconstructed data packets may thereby maintain the endpoint-to-endpoint authentication protocols.

19 Claims, 8 Drawing Sheets

COMPRESSION OF DATA PACKETS WHILE MAINTAINING ENDPOINT-TO-ENDPOINT AUTHENTICATION

BACKGROUND

Computers typically communicate by exchanging data packets over a network. The network has a limited amount of bandwidth available to transport the data packets from one endpoint to another. The available bandwidth limits the rate at which the computers can exchange the data packets. Inadequate rates of data packet transfer result in inefficiencies. For the non-commercial user, inadequate rates of transfer may result in frustration. In the commercial setting, a slow transfer may hinder productivity and profitability.

Businesses often have sustained end-to-end connections, such as between two or more physical locations. There may be a headquarters and several branch offices, for example. In order to increase the throughput of data packets, each endpoint may employ an accelerator device that is logically located between the sending device and the receiving device. The accelerator device is a network transparent device in that data packets are received that are addressed to downstream devices, and the accelerator device may pass through packets unchanged or may collect packets for compression and transmission in a compressed state.

The accelerator device may apply compression to the payload of the data packets to increase the throughput and improve the user experience. However, the accelerator device terminate the transport layer stream of the incoming packets by discarding the original header and act as a proxy service to deliver the payload.

While the accelerator device may provide desirable compression, the termination of the transport layer stream presents problems. As one particular example, endpoint-to-endpoint authentication protocols such as Internet Protocol Security (IPSec) and Server Message Block (SMB) signing are no longer possible.

SUMMARY

Embodiments provide for the compression of contiguous data packets of a single communication session between endpoints while preserving the original headers of the communication session such that endpoint-to-endpoint authentication protocols may be maintained. The compression of at least the payloads of the contiguous data packets occurs via at least one compressible buffer to thereby compress the payloads of the contiguous data packets collectively as a group rather than individually. Different data packets corresponding to a second single communication session between a sending and a receiving device are transmitted to the receiving device in order to transfer the compressed headers and the original headers of the contiguous data packets of the first single communication session. The receiving device decompresses at least the compressed payloads and then reconstructs the original contiguous data packets of the first single communication session between endpoints by matching the original headers to the original payloads. The reconstructed contiguous data packets may then be inserted into the first single communication session between endpoints at the receiving device so as to deliver each of the contiguous data packets from the receiving device to the endpoint device to which the original contiguous data packets were destined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Embodiments provide for the compression of a set of contiguous data packets of a single communication session between endpoints and for the transmission of the compressed set of contiguous data packets to a receiving device. Compression may include compressing only the payloads or compressing both the headers and the payloads. Both the compressed payloads and the original headers, either compressed or not, are transferred to the receiving device which then decompresses at least the payloads and reconstructs the original set of contiguous data packets. Logic may be employed prior to compression to select those contiguous data packets that are eligible for compression and to maximize the amount of data included in at least one compressible buffer.

Figure 1A:
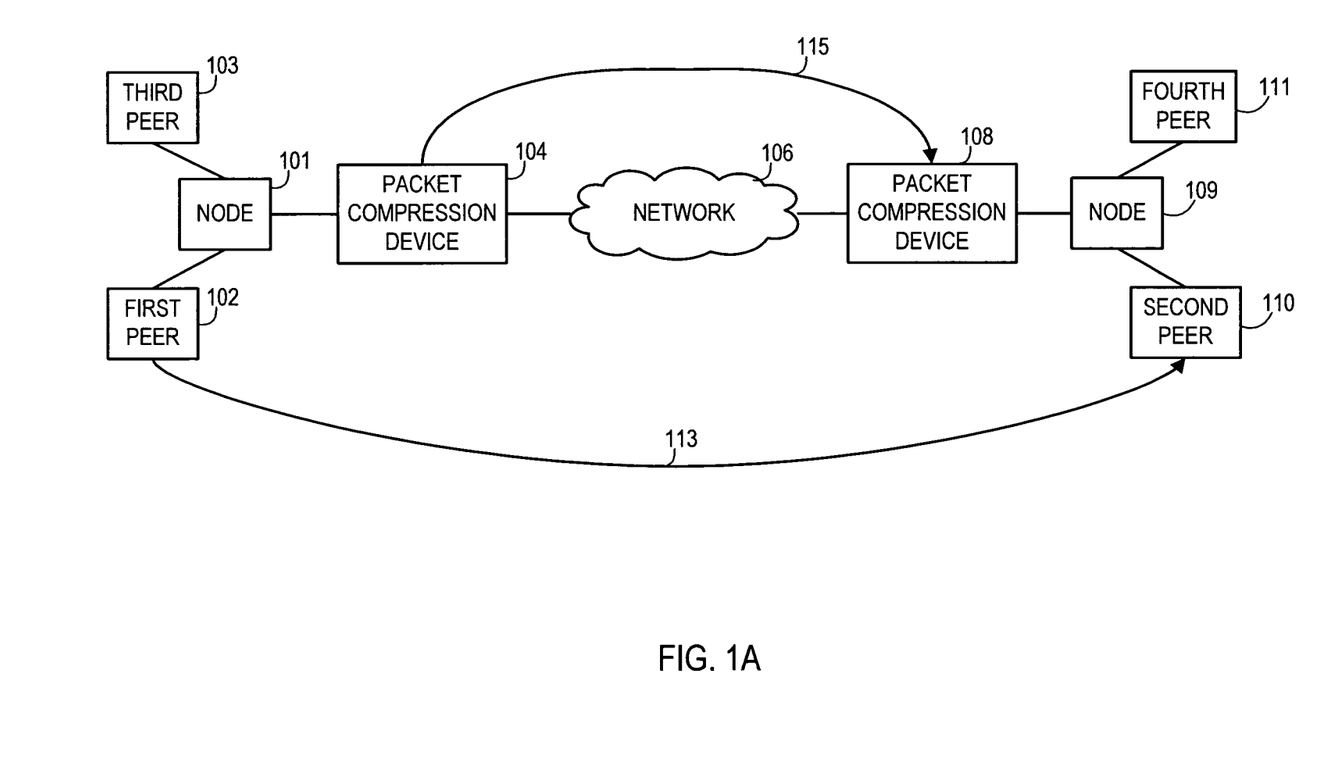
FIG. 1A shows an example environment for various embodiments of data packet compression devices.

FIG. 1A shows one example of an operating environment for various illustrative embodiments. In this example, several peer devices may be present at various locations and may be communicating through a network 106 with various peer devices at other locations. For purposes of illustration, a first location includes a first peer device 102 and a third peer device 103 connected to a node 101 such as a network switch which receives data packets sent from the first peer device 102 and third peer device 103. The node 101 then transfers data packets destined for other locations to a first packet compression device 104. The node 101 may also receive data packets from the first packet compression device 104 and then direct them to the first peer device 102 or the third peer device 103.

The first packet compression device 104 may be a network transparent device because packets from the first peer device 102 and from the third peer device 103 are not addressed to the first packet compression device 104 but are passed to it for further delivery through the network 106. It will be appreciated that varying numbers of peer devices may be present at this location and that if only the first peer device 102 is present, it may be connected directly to the first packet compression device 104. Furthermore, the functionality of the first packet compression device 104 may be integrated into the first peer device 102 rather than being a stand-alone device as shown in this example.

Also for purposes of illustration, a second location includes a second peer device 110 and a fourth peer device 111 that are connected to a node 109 which receives data packets from the second peer device 110 and from the fourth peer device 111. The node 109 then transfers data packets destined for other locations to a second packet compression device 108. The node 109 may also receive data packets from the second packet compression device 108 and then direct them to the second peer device 110 or the fourth peer device 111.

Like the first packet compression device 104, the second packet compression device may also be a network transparent device because packets from the second peer device 110 and from the fourth peer device 111 are not addressed to the second packet compression device 108 but are passed to it for further delivery through the network 106. It will be appreciated that varying numbers of peer devices may be present at this location and that if only the second peer device 110 is present, it may be connected directly to the second packet compression device 108. Furthermore, the functionality of the second packet compression device 108 may be integrated into the second peer device 110 rather than being a stand-alone device as shown in this example.

When first peer device 102 sends data packets addressed to the second peer device 110 or fourth peer device 111, the packet compression device 104 may compress a set of contiguous data packets being sent by the first peer device 102 as a single data set of at least one single compressible buffer. The compression may include compression of payloads of the contiguous data packets or headers and payloads of those contiguous data packets. The headers and compressed payloads are then transmitted to the second packet compression device 108 where the payloads, and if necessary the headers, are decompressed. The headers are then matched to the payloads to reconstruct the original data packets sent from the first peer device 102, and the second packet compression device 108 then injects those reconstructed original data packets into the communication session between the first peer 102 and the second peer 110 or fourth peer 111 to deliver the reconstructed original data packets to the intended destination.

The same actions may take place in the opposite direction where the second peer device 110 is sending data packets to the first peer device 102 or the third peer device 103. The second packet compression device 108 compresses at least the payloads and transmits the original headers and the compressed payloads to the first packet compression device 104. The first packet compression device 104 than decompresses the payloads and the headers, if necessary, and then reconstructs the original packets sent from the second peer device 110.

For purposes of illustration, where the first peer device 102 is communicating with the second peer device 110, a first communication session 113 is established between these endpoints such as by creating a transport layer stream between them through network 106. When the first peer device 102 attempts to send data to the second peer device 110 through the network 106, a contiguous byte stream flows through the first communication session 113 where the byte stream forms the sequence of data packets, each having headers and payload. The transport layer stream is maintained by the transport layer headers present within those data packets of the byte stream.

Also for purposes of illustration, where the packet compression device 104 is receiving the packets of the first communication session 113 in order to transmit them on through the network 106, the packet compression device 104 may collect at least some of them for compression. The compressed data packets may then be transmitted through a second communication session 115 that is established between the packet compression device 104 and the packet compression device 108 through the network 106. This second communication session 115 may be created as a transport layer stream maintained between the packet compression device 104 and the packet compression device 108.

Figure 1B:
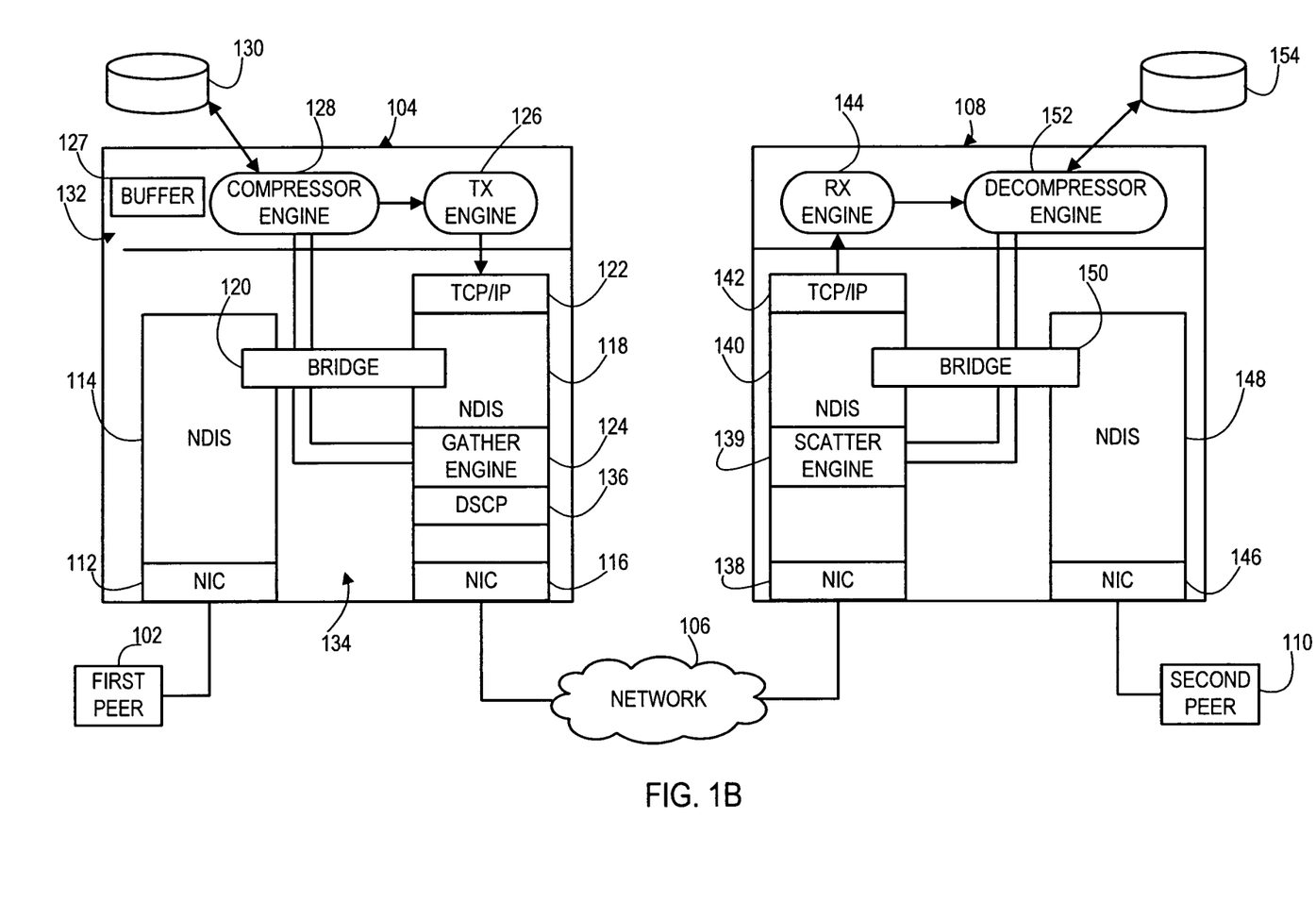
FIG. 1B shows an illustrative embodiment of two data packet compression devices in communication over the network.

FIG. 1B shows an example of one illustrative implementation of the first packet compression device 104 and the second packet compression device 108. In this example, the first packet compression device 104 and second packet compression device 108 are present for providing a compression service for the data communications occurring between the first peer device 102 and the second peer device 110.

This illustrative implementation of the first packet compression device 104 includes various components that form a processing system. In this example, the processing system of the first packet compression device 104 includes a kernel mode portion 134 and a user mode portion 132. The kernel mode portion 134 sends and receives data via a first network interface card (NIC) 112 that provides a physical connection to the first peer device 102 or to some intervening device such that data packets are exchanged between the first peer device 102 and the first packet compression device 104. A data link layer 114, such as a network driver interface specification layer (NDIS) operates with the NIC 112 to pass the packets over a bridge 120 to the data link layer 118 which passed the packets up to the network and transport layers 122. The network and transport layers 122 may utilize protocols such as the Internet Protocol (IP) for the network layer and transmission control protocol (TCP) or user datagram protocol (UDP) for the associated transport layer. Other examples of the data link, network, and transport layers are also applicable to the various embodiments.

In this particular example, the first packet compression device 104 is physically located in the data path between the first peer device 102 and the network 106. Accordingly, the kernel mode portion 134 sends and receives data via a second NIC 116, and the kernel mode portion 134 includes an associated data link layer 118 that provides packets up to the network and transport layers 122. The NIC 116 exchanges packets over the network 106, such as a wide area network interconnecting the local network of the first peer device 102 to the local network of the second peer device 110.

Coupled to the data link layer 118 of the first packet compression device 104 is a gather engine 124 that collects packets sent by first peer device 102 into a set and then provides the set to at least one single compressible buffer 127 of the user mode portion 132. The gather engine may be a driver, such as an NDIS filter driver or an NDIS Intermediate (IM) driver, depending upon an operating system platform of the first packet compression device 104.

The gather engine 124 of this illustrative implementation includes a kernel portion and a user mode portion. The kernel mode portion collects the contiguous data packets from a particular incoming communication session between endpoints and separates the collected set of contiguous data packets into segments including headers separated from payloads. The kernel portion passes the segments to the user mode portion which manages the loading of at least the payloads into the at least one single compressible buffer 127 as a single data set to be compressed. At the user mode portion 132, the data set containing the segments to be compressed may then be accessed from the buffer 127, compressed, and transmitted to the second packet compression device 108.

The data link layer 118 of this illustrative implementation may also maintain a quality of service (QoS) marker, such as a differentiated services code point (DSCP) marker 136 that is used to mark outgoing DSCP values for streams between the first packet compression device 104 and the second packet compression device 108. The marking of outgoing packets to preserve the quality of service intended for the original data packets being compressed is discussed further below.

The user mode portion 132 of this illustrative implementation of the first packet compression device 104 forms a processing system that includes various components as well. As discussed, the gather engine 124 includes a user mode portion that buffers at least payloads from a given incoming stream of a communication between endpoints through NIC 112. The user mode portion of the gather engine 124 then provides at least the set of payloads as a single data set of at least one single compressible buffer 127 to a compressor engine 128.

The compressor engine 128 receives at least the payloads as a single data set of the at least one single compressible buffer 127 from the gather engine 124 and performs one or more compression algorithms to compress as a single data set at least the payloads from the at least one single compressible buffer 127. By compressing at least the payloads from the at least one single compressible buffer as a single data set, the compressor engine 128 is compressing the payloads collectively, rather than individually. By increasing the size of the single data set that is being compressed, the compression ratio may be increased.

The compressor engine 128 may utilize a storage device 130 to maintain dictionaries of previously seen data and other reference information that may be utilized when performing the various compression algorithms. Furthermore, the compressor engine 128 may employ one algorithm to the payload contents of the at least one single compressible buffer and employ another algorithm to a different single compressible buffer that includes headers.

Examples of compression algorithms that may be applied to the header contents of compressible buffers that include headers include various differential algorithms and various stateless compression algorithms. Examples of differential algorithms include those described in Request For Comment (RFC) 1144, 2507, 2508, 2509, 3095, and 4815, each of which is incorporated by reference herein. Examples of stateless compression algorithms include Lempel-Ziv-Welch (LZW) or Huffman encoding.

Examples of compression algorithms that may be applied to contents of compressible buffers that include payloads include various stateful differential algorithms and various stateless compression algorithms. An example of stateful differential algorithms includes Remote Differential Compression (RDC) as used in Distributed File System Replication (DFSR). Examples of stateless compression algorithms include LZW and Huffman encoding.

A transmission engine 126 receives compressed data sets from the compressor engine 128. The transmission engine 126 then sends the data sets through a second communication session that is between the first packet compression device 104 and the second packet compression device 108. The transmission engine 126 may utilize the network and transport layers 122 to packetize the data sets and send the resulting packets via the data link layer 118 and NIC 116 to the second packet compression device 108 through the second communication session. Thus, the compressed packets are tunneled in a collectively compressed form through the network 106.

The components of the first packet compression device 104 that are shown for this example are those components relevant to the collecting, compressing, and transmitting of the incoming data packets from the first peer device 102. It will be appreciated that the first packet compression device 104 and the second packet compression device 108 may be complementary devices in that for data traveling in one direction, the first packet compression device 104 may collect, segment, compress, and transmit while the second packet compression device 108 performs the complementary functions of receiving, decompressing, reconstructing, and injecting back into the stream to the second peer device 110. For data flowing in the opposite direction, the second packet compression device 108 may collect, segment, compress, and transmit while the first packet compression device 104 receives, decompresses, reconstructs, and injects back into the stream to the first peer device 102.

Accordingly, while the first packet compression device 104 is shown with one set of components and the second packet compression device 108 is shown with a different and complementary set of components, it will be appreciated that the first packet compression device 104 may also contain the components shown for the second packet compression device 108 and the second packet compression device 108 may also contain the components shown for the first packet compression device 104.

The illustrative implementation shown for the second packet compression device 108 also includes a kernel mode portion, aNIC 138 to interface to the network 106 and a NIC 146 to interface to the second peer device 110. The second packet compression device 108 includes data link layers 140 and 148, a scatter engine 139, a bridge 150, and network and transport layers 142. A user mode portion of this illustrative implementation includes a receiving engine 144, a decompressor engine 152, and a storage device 154.

Packets that are from the second communication session with the first packet compression device 104 and are therefore addressed to this second packet compression device 108 are received from the first compression device via the NIC 138, are passed to the network and transport layers 142 (e.g., TCP/IP) which then depacketize the information by extracting packet payloads and piecing the payloads together in a specified order. The network and transport layers 142 provide the application data to a receiving engine 144. This information is the compressed data set that was transmitted from the transmission engine 126 of the first packet compression device 104, where the compressed data set includes the headers, either compressed or not, and the compressed payloads of the original packets from the first peer device 102. The receiving engine 144 provides this data set to the decompressor engine 152.

The decompressor engine 152 of the second packet compression device 108 decompresses the data set utilizing a decompression algorithm(s) that is complementary to the compression algorithm(s) employed by the compressor engine 128 of the first packet compression device 104. In doing so, the decompressor engine 152 may rely upon dictionaries and other reference information of the storage device 154, including dictionaries and other reference information that is complementary to that of the storage device 130 of the first packet compression device 104.

The decompressor engine 152 provides the segments including headers and decompressed payloads of the original data packets to a buffer managed by a user mode portion of the scatter engine 139. The scatter engine 139 ultimately distributes decompressed packets back into the communication sessions between endpoints from which the packets originated so that the communication session is uninterrupted. The user mode portion of the scatter engine 139 provides the decompressed headers, payloads, and any other portions of the original packets to the kernel mode portion of this illustrative implementation of the scatter engine. The scatter engine 139 matches the headers with the decompressed payloads to reconstruct the original packets. The scatter engine 139 then injects the reconstructed original packets into the stream to the second peer device 110 via the bridge 150.

The first packet compression device 104 and second packet compression device 108 of FIG. 1B are shown for purposes of illustration and are not intended to be limiting. For example, while the first packet compression device 104 and the second packet compression device 108 are shown as stand-alone structures, these devices may instead be incorporated into endpoints. For example, the first packet compression device 104 may be incorporated into the structure of the first peer device 102, thus eliminating the presence of the NIC 112.

Additionally, the implementations of the first packet compression device and second packet compression device included some kernel mode components and some user mode components. It will be appreciated that the various components and their functions may be implemented in alternative configurations. For example, all of the components and their functions may be implemented within the kernel mode.

The components of the first packet compression device 104 and the second packet compression device 108 may be constructed of hard-wired logic, firmware, general-purpose programmable processors implementing programming stored in memory such as the storage device 130 or 154, and so forth. The devices of FIG. 1B, including the first packet compression device 104 and the second packet compression device 108 as well as the first peer device 102 and the second peer device 110 may include a variety of computer readable media. Such computer readable media contains the instructions for operation of the device and for implementation of the embodiments discussed herein. Computer readable media can be any available media that can be accessed by a computer system and includes both volatile and nonvolatile media, removable and non-removable media. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer system.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIGS. 2A-3B illustrate operational flows for the compression or decompression of data packets. The following descriptions of FIGS. 2A-3B are made with reference to the compression devices 104, 108 of FIG. 1. However, it should be understood that the flow described with respect to FIGS. 2A-3B is not intended to be limited to being performed by the compression devices 104, 108, or any particular component or group of components of the compression devices 104, 108. Additionally, it should be understood that while the operational flows of FIGS. 2A-3B indicate a particular order of steps, in other implementations the operations may be ordered differently, additional operations may be added, and/or some operations may be omitted.

Figure 2A:
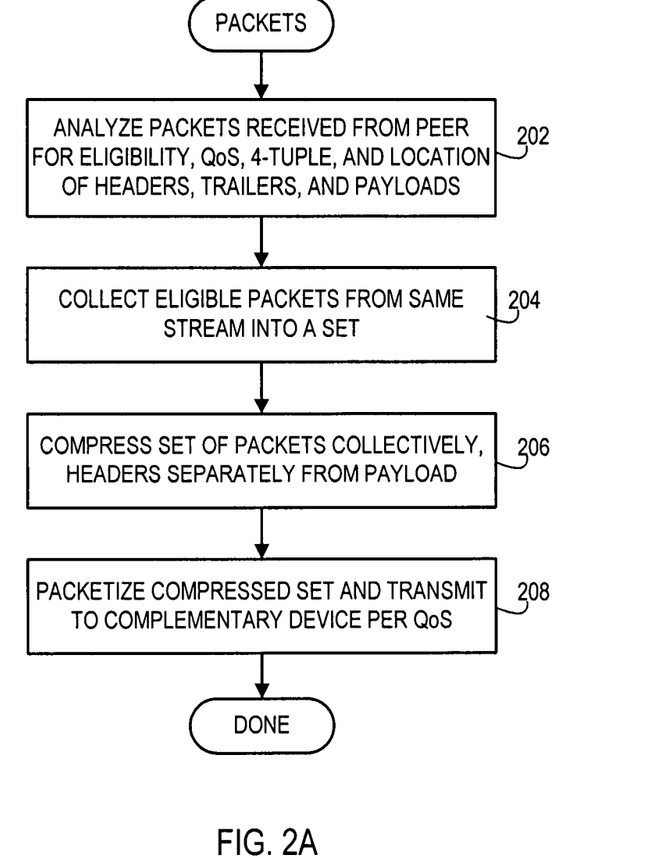
FIG. 2A shows an example of a set of logical operations to collectively compress at least payloads of a set of contiguous data packets of a single communication session between endpoints.

FIG. 2A shows a set of logical operations that may be performed by one or more embodiments of a packet compression device in order to provide the compression of incoming data packets. The logical operations begin with the packet compression device, such as the first packet compression device 104 and particularly the gather engine 124, analyzing incoming packets from the local peer for eligibility to compress at analysis operation 202. The incoming packets are also analyzed for information needed to successfully transmit to the receiving packet compression device, such as the second packet compression device 108, for the destination peer at analysis operation 202.

Certain packets such as those that are encrypted are ineligible for compression because they may need to be passed through to the receiving packet compression device with no compression applied to be effective. These ineligible packets may be found and passed through by analysis operation 202. Additional details of one implementation of analysis operation 202 are discussed below in relation to FIG. 3A.

At this point, information needed to properly transmit and, when eligible, needed to compress the eligible data packets may be collected. This information may include a four-tuple of sending port, sending address, destination port, and destination address that identifies a transport layer stream to which this packet belongs. Information needed for determining whether to compress and for organizing the collective compression with other packets may also be obtained at this point, including the locations of the headers within each packet, the location of the payload within each packet, and the location of any trailers that may also be present.

Upon completing the analysis for eligibility of an incoming packet, the eligible packet of a given transport layer stream (e.g., a TCP or UDP stream) is collected into a compressible buffer 127 with other packets of that stream that are also eligible for compression at collection operation 204. The collection of these eligible data packets into a set allows for either the entire packet or selected segments thereof (e.g., payloads) to be provided within the at least one single compressible buffer 127. Here, the eligible packets may be broken down into header, payload, and trailer if any with each segment being separately buffered with like segment types of other data packets of this same stream. Additional details of one implementation of collection operation 204 are discussed below in relation to FIG. 3B.

The collection of the packets into a set for compression may need to be constrained to minimize the degradation of the endpoint-to-endpoint connection. For example, delaying transfer of a packet for too long while waiting to fill the at least one single compressible buffer 127 may result in a transport layer timeout. Thus, at this point a determination is made as to whether the set has reached a point at which the compression should commence in order to keep compression ratios at a desirable level while not degrading the endpoint-to-endpoint connection. Details of this determination according to one implementation are also discussed below in relation to FIG. 3B.

The set of data packets or segments is then passed as contents of at least one single compressible buffer 127 to the compressor engine 128 once it is determined that compression should commence. In certain circumstances, a single packet may be passed directly to the compressor engine 128 for immediate compression and transmission to the receiving compression device such as where the single packet is intended to start a new transport layer stream or terminate an existing transport layer stream.

Upon passing the contents of the at least one single compressible buffer 127 to the compressor engine 128, the contents of the at least one single compressible buffer 127 are then compressed at compression operation 206. The compression is collective in that the compression algorithm acts upon multiple packets, or segments of multiple packets, of the at least one single compressible buffer 127 to produce a compressed output, rather than acting upon a single packet or segment of a single packet at a time. Because more data is acted upon to produce the compressed result when compressing contents of the at least one single compressible buffer 127 containing multiple data packets or segments from multiple data packets, the compression ratio may be higher. A compressed data set is produced by the compressor engine 128. There may be one compressed data set for each segment type that has been compressed for embodiments where different algorithms are used for different segment types. Alternatively, a compressed data set for payloads may be concatenated with a data set that includes headers and then the concatenated data set may be compressed.

Upon producing the compressed data sets, the transmission engine 126 transmits the compressed data sets to the receiving compression device at transmission operation 208. Here, the data sets are introduced to the network and transport layers 122 (e.g., TCP/IP) where the data sets are packetized and transmitted via a communication session with the receiving compression device. These packets being sent to the receiving compression device are tunnel packets because they are providing a tunnel through which the underlying compressed data packets are being delivered. The stages of one illustrative implementation of the compression and transmission of are discussed in more detail below in relation to FIG. 4A.

The data packets being sent from the first packet compression device 104 containing the compressed data sets may have QoS markings to ensure that the packets are being transmitted With sufficient priority. The QoS markings for these outgoing packets may be selected on the basis of the QoS markings of the original packets received from the local peer. For example, if an incoming packet has a particular QoS priority, then that QoS marking, such as a DSCP marking, may be stored in memory. The tunnel packets being sent to the receiving compression device are marked with the same DSCP marking as the original packets to further maintain transparency of the compression devices for the end-to-end connection. As an alternative, a QoS marking for the outgoing packets may be selected based upon some criteria other than the QoS marking of the original data packets.

Figure 2B:
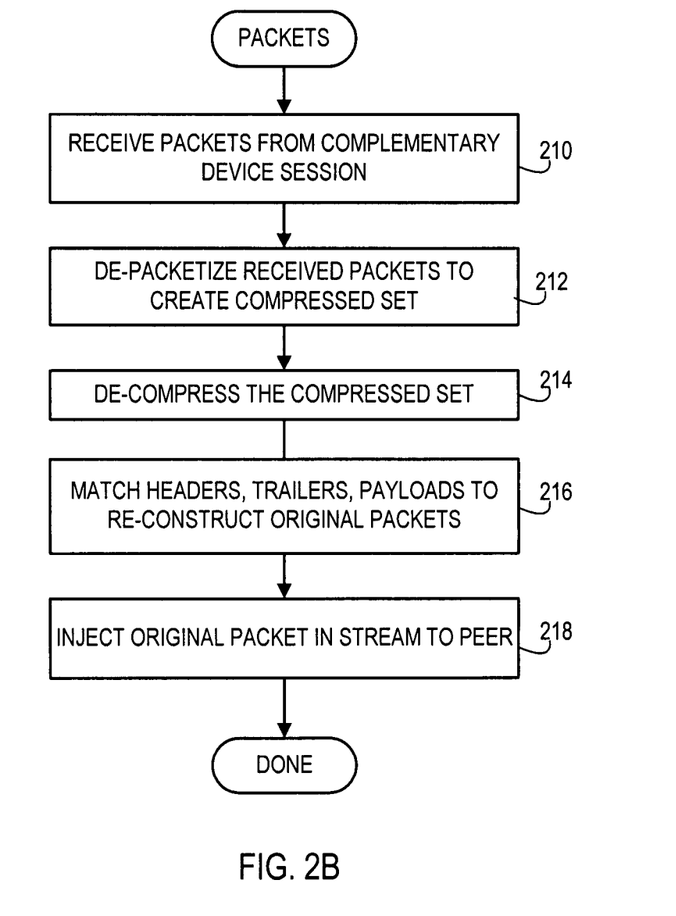
FIG. 2B shows an example of a set of logical operations to decompress at least payloads of a set of contiguous data packets and reconstruct the contiguous data packets into their original form.

FIG. 2B shows a set of logical operations that may be performed by one or more embodiments of a compression device in order to decompress data of incoming data packets and reconstruct the original packets from the decompressed data. The logical operations begin with the receiving compression device, such as the second packet compression device 108, receiving the tunnel packets sent by the sending compression device, such as the first packet compression device 104, at reception operation 210. As the tunnel packets are addressed to the receiving device, the packets are passed up the protocol layers rather than being passed through to a local peer of the receiving compression device.

The network and transport layers 142 receive the packets and depacketize them at packet operation 212 to reveal the compressed data sets that have been previously generated and transmitted by the sending compression device. The receiving engine 144 receives the compressed data making up the data sets, including the separate header data set and payload data set for embodiments where headers and payloads are compressed separately. The receiving engine 144 passes those on to the decompressor engine 152.

The decompressor engine 152 decompresses the data sets at decompression operation 214. A decompression that is complementary to the compression that has been performed by the sending compression device is employed. The compressed data set may include a header that is created by the compression algorithm and that identifies the compression technique that has been utilized such that the decompressor engine 152 may read that header from the compressed data set to then decompress using the appropriate decompression algorithm. Furthermore, there may be higher level agreements in place between two complementary compression devices that dictate which compression algorithms will be utilized. Decompressed data sets are then passed to the scatter engine 139 where the packets can be reconstructed.

The scatter engine 139 reconstructs the original data packets by matching the headers, payloads, and any trailers at reconstruction operation 216. Here, the scatter engine 139 matches a header with its corresponding payload by referring to the metadata of the decompressed data set to locate the headers and the payloads based on offsets and exact lengths of the segments, where the ordering of the headers matches the ordering of the payloads. The scatter engine 139 may also add data that has not been transferred when appropriate, such as adding Ethernet headers and IPSec ESP trailer padding, each of which is information already known to the scatter engine 139.

Once the original data packets have been reconstructed, the scatter engine 139 then injects them into the end-to-end stream directed to the peer device local to the receiving compression engine at injection operation 218. By injecting them into the existing end-to-end stream, the peer receives the original packets with the original headers and payloads such that end-to-end authentication is maintained. The stages of one illustrative implementation of decompressing received packets and reconstructing the original contiguous data packets are discussed in more detail below with reference to FIG. 4B.

Figure 3A:
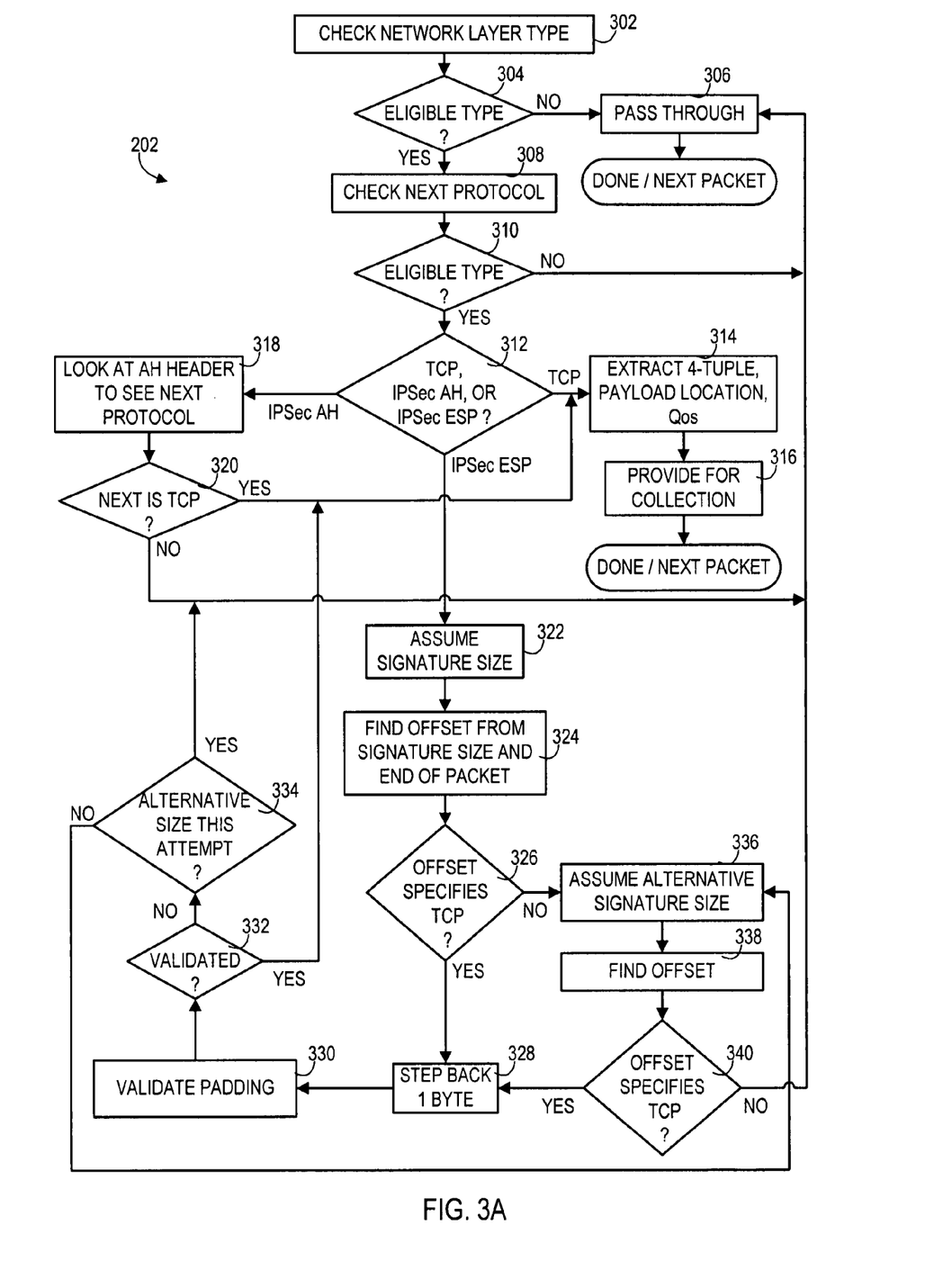
FIG. 3A shows an example of a set of logical operations to analyze incoming data packets for eligibility to compress such as during the logical operations of FIG. 2A.

FIG. 3A shows an illustrative set of logical operations that may be performed in various embodiments to perform the analysis operation 202 of FIG. 2A. The goal of this example is to determine which packets are eligible for compression and to extract the necessary information to allow for an efficient compression and transmission of the packet while avoiding degrading the endpoint-to-endpoint connection due to transport layer timeouts or other impactful delays. These logical operations are provided for purposes of illustration and are not intended to be limiting, as it will be appreciated that various alternatives exist.

The logical operations of this example begin at type operation 302 where the gather engine 124 detects the network layer type of the incoming packet by checking a data link header of the packet. An option may be that only packets with certain types of network layer protocols, for example Internet Protocol (IP), are eligible for compression. In that case, a query operation 304 detects whether the type for the current packet is eligible, and if not, then the packet is passed through to the receiving compression device without compression at pass operation 306.

Where query operation 304 detects that the packet does have an eligible network layer type, then a type operation 308 checks for the next protocol of the packet, such as the transport layer protocol, by checking the network layer header. A query operation 310 detects whether this next protocol type is eligible for compression, and if not, then the packet is passed through to the receiving compression device without compression at pass operation 306. A further option may be that only packets with certain types of protocols above the network layer are eligible for compression. For example, query operation 310 may check for a TCP packet, a UDP packet, an Internet Protocol Security Authentication Header (IPSec AH) packet, and/or an Internet Protocol Security Encapsulating Security Payload (IPSec ESP) packet. For purposes of illustration, the discussion will proceed as if the eligible types are TCP, IPSec AH, and IPSec ESP, but it will be appreciated that other types may also be eligible.

A query operation 312 detects whether the packet is TCP, IPSec AH, or IPSec ESP by determining whether a security header for IPSec AH or IPSec ESP is present. Where this next protocol is TCP, then the gather engine 124 extracts information needed for compression and transmission including the four-tuple of sending address, sending port, destination address, and destination port at extraction operation 314. Additional information is also extracted in this example including the location of the headers and payload and the QoS marking of the network layer header based on the packet being an eligible TCP packet. The packet is then provided for collection by the gather engine 124, such as by passing the packet from the kernel mode portion to the user mode portion of the gather engine 124 where the packet can be queued in the at least one single compressible buffer 127 prior to being input to the compressor engine 128 at collection operation 316. The next incoming data packet is then processed by the logical operations of FIG. 3A.

Where query operation 312 detects that the packet is IPSec AH, then the gather engine 124 looks at the security header, which is an authentication header in the case of IPSec AH, to check the type of the next protocol at type operation 318. A query operation 320 then detects whether this next protocol is TCP. If it is not TCP, then pass operation 306 passes the packet through without compression. If this packet is TCP, then extraction operation 314 extracts the information, and collection operation 316 provides the packet for inclusion in the at least one single compressible buffer 127.

Where query operation 312 detects that the packet is IPSec ESP, then a determination may be necessary to detect whether this packet is an encrypted packet or an authenticated packet. An option may be that encrypted packets are not compressed while authenticated packets are compressed. The following logical operations may be performed to heuristically determine whether the packet is encrypted or authenticated.

The gather engine 124 assumes a particular size of an ESP signature of the packet at signature operation 322. The size may vary depending upon the version of the operating system and hardware of the peer device sending the packet. For example, the ESP signature may be 12 bytes or may be 16 bytes, or other sizes depending upon the operating system of the sending peer. The gather engine 124 then finds the offset of the packet on the basis of the signature size relative to the end of the packet at offset operation 324. A query operation 326 then detects whether a protocol number at this offset location indicates that the packet is TCP. If at query operation 326 the gather engine 124 detects for the first assumed signature size that the protocol specified at the offset location is not TCP, then operational flow proceeds directly to a signature operation 336, discussed below.

Where the gather engine 124 has determined that the packet is TCP, then the gather engine 124 steps backwards in the packet by 1 byte, the length of the padding in the ESP trailer, at step operation 328. An attempt at validating the padding values is done at validation operation 330, where the padding has a regular pattern: 1, 2, and so on. For authenticated ESP data packets, it is expected that the padding is used to make the overall packet size equal to 4 bytes aligned. Details of the padding are discussed in RFC 2406 which is incorporated by reference herein.

A query operation 332 detects whether the validation of the padding values has succeeded or failed. If the validation succeeded, then it may be assumed that this packet is an IPSec ESP authenticated packet, and extraction operation 314 then extracts the information while collection operation 316 provides the packet for inclusion in the at least one single compressible buffer 127. If the validation has failed, then a query operation 334 detects whether this attempt was the initial attempt or was the second attempt based on an alternative assumed signature size. Note that these logical operations provide for attempts with two assumed signature sizes for purposes of illustration only. It will be appreciated that if additional signature sizes are possible, then additional signature sizes may also be attempted in the same manner.

If this was the second attempt such that both assumed signature sizes have resulted in a failed validation of the padding values, then in this example pass operation 306 passes through the packet without compression. If this was only the initial attempt such that an alternative signature size has yet to be attempted, then operational flow proceeds to signature operation 336. At signature operation 336, the gather engine assumes the alternative signature size. Then, an offset operation 338 finds the offset of the packet on the basis of the alternative assumed signature size relative to the end of the packet. A query operation 340 then detects whether a protocol number at this offset location indicates that the packet is TCP. If not, then in this example, pass operation 306 passes the packet through without compression since there are no other signature sizes to attempt. If the offset location does specify TCP, then operational flow proceeds to step operation 328 where the operations proceed as discussed above.

It is conceivable, albeit unlikely, that an ESP encrypted packet may be mistaken for an authenticated packet even after matching the protocol type to TCP and validating the padding values. In order to avoid attempting compression of this ESP encrypted packet, it may be queued while the next few packets, e.g., next 3-4, are also examined to verify that they are also ESP authenticated packets rather than ESP encrypted ones. Once it is verified that these subsequent packets are also ESP authenticated, then the queued packet may be passed on to the at least one single compressible buffer 127 along with the subsequent ones since it is almost certainly an ESP authenticated packet as well.

Figure 3B:
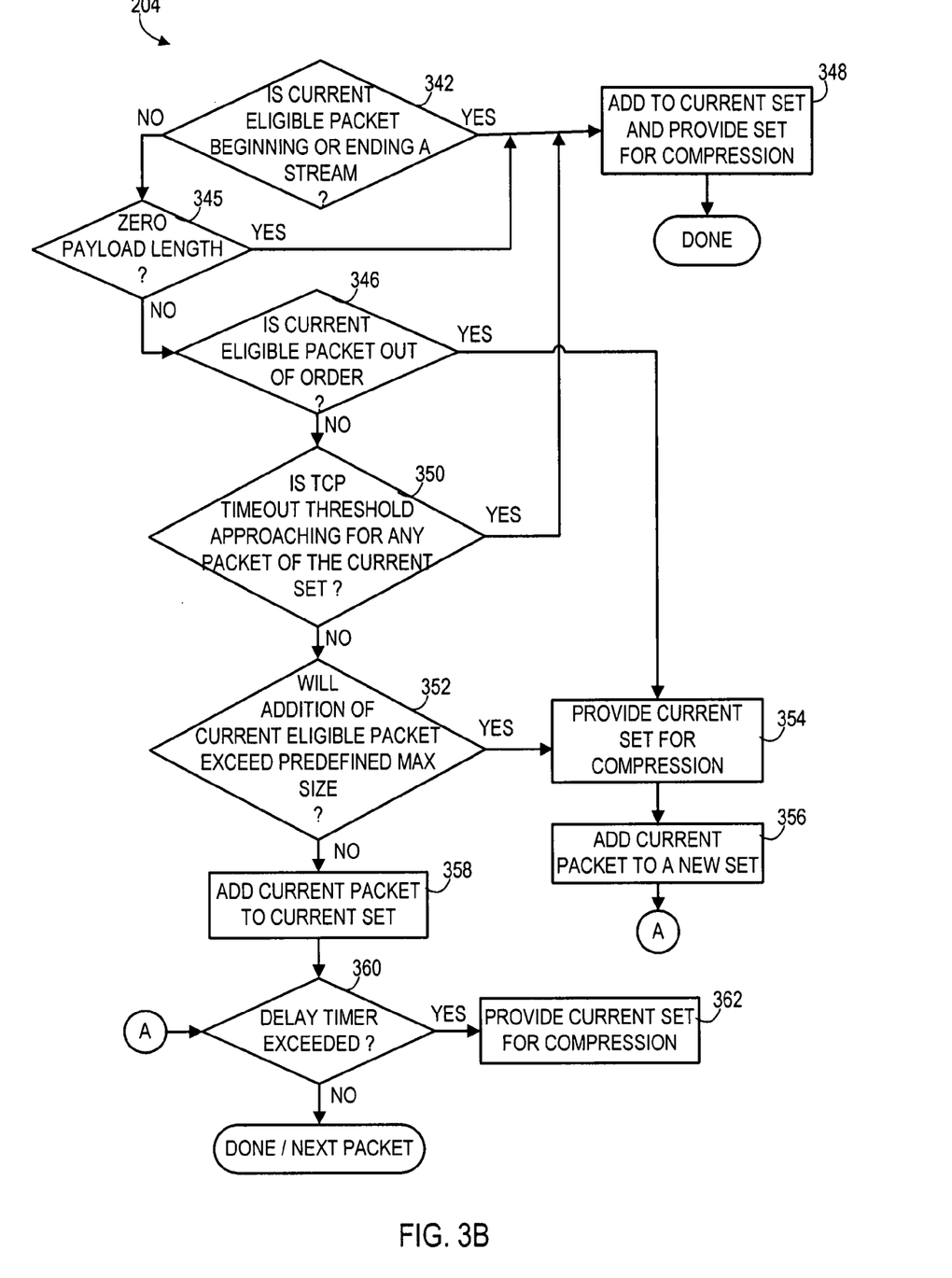
FIG. 3B shows an example of a set of logical operations to determine the initiation of compression of at least one compressible buffer including at least payloads of a set of incoming contiguous data packets such as during the logical operations of FIG. 2A.

FIG. 3B shows an example of logical operations performed by the gather engine 124 to collect the contiguous packets or payload segments thereof in the at least one single compressible buffer 127 as in collection operation 204 of FIG. 2A. In this example, a goal may be to collect as many data packets or payload segments thereof as possible in the at least one single compressible buffer 127 so that the data set being passed to the compressor engine 128 is as large as possible. An additional goal may be to also minimize negative effects to the endpoint-to-endpoint stream such as timeouts, latency, and decreased responsiveness of user applications. These logical operations are also provided for purposes of illustration and are not intended to be limiting, as it will be appreciated that various alternatives exist for these operations as well.

The logical operations begin at query operation 342 which detects whether the current packet is the beginning or ending packet of a stream. For example, the gather engine 124 may check the header to see if the SYN, FIN, or RST TCP flags are set. If so, then the packet is added to the current set in the at least one single compressible buffer 127 and the contents of the at least one single compressible buffer 127 are immediately sent to the compressor engine 128 for compression and sending to avoid any further delay in delivering the data packets to the remote peer at compression operation 348. As previously discussed, adding data packets to the at least one single compressible buffer 127 may involve separating the packets into the various segments, with each segment type being separately buffered so that different compression algorithms may be applied to the different segment types to most efficiently compress the data packets. During this separation process, the metadata that specifies the order and lengths of the headers and payloads may be collected and buffered as well.

If the current packet is not a beginning or ending packet of a stream, then query operation 345 detects whether the current packet has a zero length payload. If it does have a zero length payload, such as a TCP ACK packet, then the packet is added to the current set in the at least one single compressible buffer 127. The contents of the at least one single compressible buffer 127 are immediately sent to the compressor engine 128 for compression and sending to avoid any further delay in delivering it to the remote peer at compression operation 348. If the current packet does not have a zero length payload, then operational flow proceeds to a query operation 346.

Query operation 346 detects whether the current data packet is out of order in the sequence of packets that have been received for this endpoint-to-endpoint stream. This may be based on the TCP sequence number of the current packet relative to the TCP sequence number of the last collected packed in the queue. If the current data packet is out of order, then the current set of data packets or payload segments thereof within the at least one single compressible buffer 127 is provided for compression at compression operation 354 while the current data packet is then added to a new instance of the at least one single compressible buffer 127 to begin a new set of packets at collection operation 356. This is done to avoid sending a large number of packets out of sequence to the receiving packet compression device which might overly degrade the communication session between endpoints.

If the current data packet is not out of order, then a query operation 350 detects whether a timeout threshold, such as a TCP timeout, is about to occur for any of the data packets in the at least one single compressible buffer 127. This may be determined by storing a time stamp that reflects the time when each data packet of the at least one single compressible buffer 127 was originally received and then by comparing that time stamp to a current time. If the timeout threshold is about to be reached, then the current data packet may be added to the at least one single compressible buffer 127 and the at least one single compressible buffer 127 may then be passed to the compressor engine 128 for compression at compression operation 348.

If the timeout threshold is not reached, then query operation 352 detects whether the addition of the current data packet or payload segment thereof to the at least one single compressible buffer 127 will exceed a predefined maximum size, for example 64 kilobytes, for the data set to be compressed. If so, then the current at least one single compressible buffer 127 is provided for compression at compression operation 354 while the current data packet is then added to a new instance of the at least one single compressible buffer 127 to begin a new set of packets at collection operation 356.

If the addition of the current data packet will not exceed the pre-defined maximum size for the at least one single compressible buffer 127, then the current data packet is added to the at least one single compressible buffer 127 at collection operation 358. Operational flow then proceeds to query operation 360. Operational flow also proceeds to query operation 360 after completion of collection operation 356. Query operation 360 detects whether a delay timer threshold has been exceeded since the last data packet was queued in the at least one single compressible buffer 127 for this stream. One example of a delay timer threshold is a fixed 3 milliseconds while another example is a dynamic value which may be adjusted according to the Round-Trip Time (RTT) of the link between the two compression devices. The time stamp for the last data packet may be compared against the current time. If the delay timer threshold has been exceeded, then the current set is provided to the compressor engine 128 at compression operation 362. If the delay timer has not been exceeded, then the gather engine 124 awaits the next data packet or another timer event which triggers it to send the collected packets to the compressor engine 128.

As discussed above, many variations may be applied. For example, if TCP re-tries are not of concern, then the query operation 350 may be omitted. As another example, the delay timer may be based on the first data packet or payload segment thereof into the queue rather than the last, where the delay timer threshold is set to an amount that is different than a TCP timeout threshold. The delay timer threshold may be set to values greater than or less than the 3 millisecond example. As yet another example, zero payload packets may be treated as if they had a payload such that query operation 345 may be omitted. Furthermore, single compressible buffers may be passed to the compressor engine by detecting whether an incoming packet has the PSH TCP flag set, which would help optimize user applications where an application level confirmation is expected but may decrease the compression ratio for applications where application level confirmations are not expected.

Figure 4A:
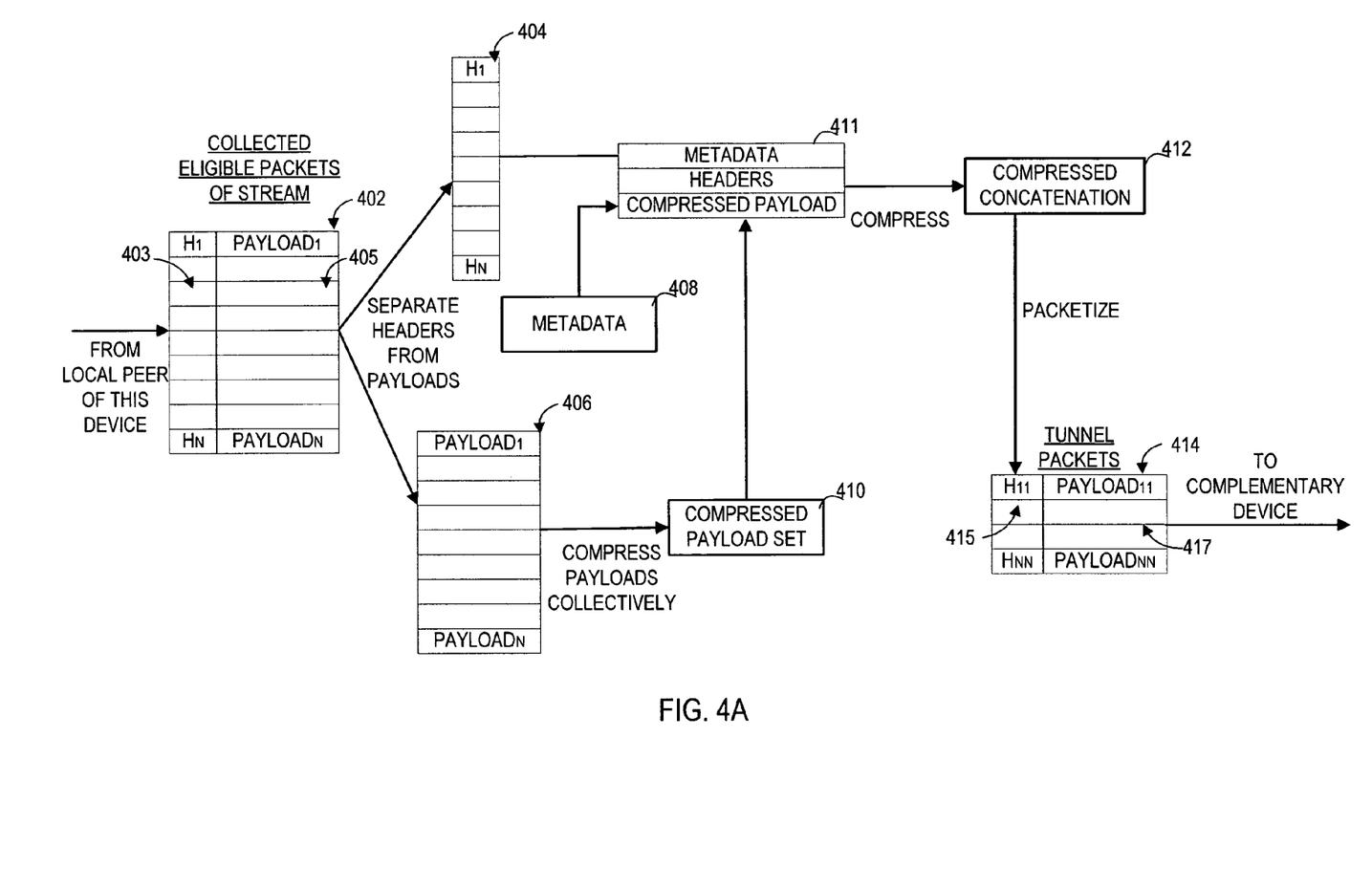
FIG. 4A shows the progression of a set of contiguous set of data packets of a single communication session between endpoints from being collected in an uncompressed state to being compressed and transmitted.

FIG. 4A shows the stages of the data packets and segments thereof as they progress through the compression and transmission phases according to one illustrative embodiment. Initially, the data packets are received from the peer device and the data packets that are eligible for compression are collected as a set of contiguous data packets 402. The data packets include headers $H_1$-$H_N$ and corresponding payloads $P_1$-$P_N$. In this embodiment, separate compression algorithms are used for each header 403 and each payload 405 to maximize the compression efficiency for each, so the packets of this set of contiguous data packets 402 are segmented to form the set of headers 404 and the set of payloads 406. Additionally, metadata 408 may be created to specify that exact lengths and order of each of the headers and payloads. The set of payloads 406 is stored in the at least one single compressible buffer 127 that is input to the compression algorithm to form a compressed payload data set 410.

In this example, the metadata 408 and set of headers 404 are then concatenated with the compressed payload data set 410 to form a concatenated set 411. Further, according to this embodiment the concatenated set 411 is then compressed using a compression technique such as LZW to form the compressed dataset 412. It will be appreciated that alternative manners of compressing exist as well, such as by separately compressing each of the three parts using a separate instance of the at least one single compressible buffer 127 for each segment type and then concatenating the results to form a compressed data set. It will further be appreciated that the headers and/or the metadata may be left uncompressed such that the concatenated set 411 may be transmitted.

In order to transmit the compressed data set 412 of this embodiment, it is then packetized to form a set of tunnel packets 414. The tunnel packets of the set of tunnel packets 414 include their own headers $H_{11}$-$H_{NN}$ and corresponding payloads $P_{11}$-$P_{NN}$. These tunnel packets are then transmitted through the network 106 to the receiving compression device. It will be appreciated that alternative manners of transferring the headers and compressed payloads are also possible, such as creating separate tunnel packets for the set of headers and the set of compressed payloads.

Figure 4B:
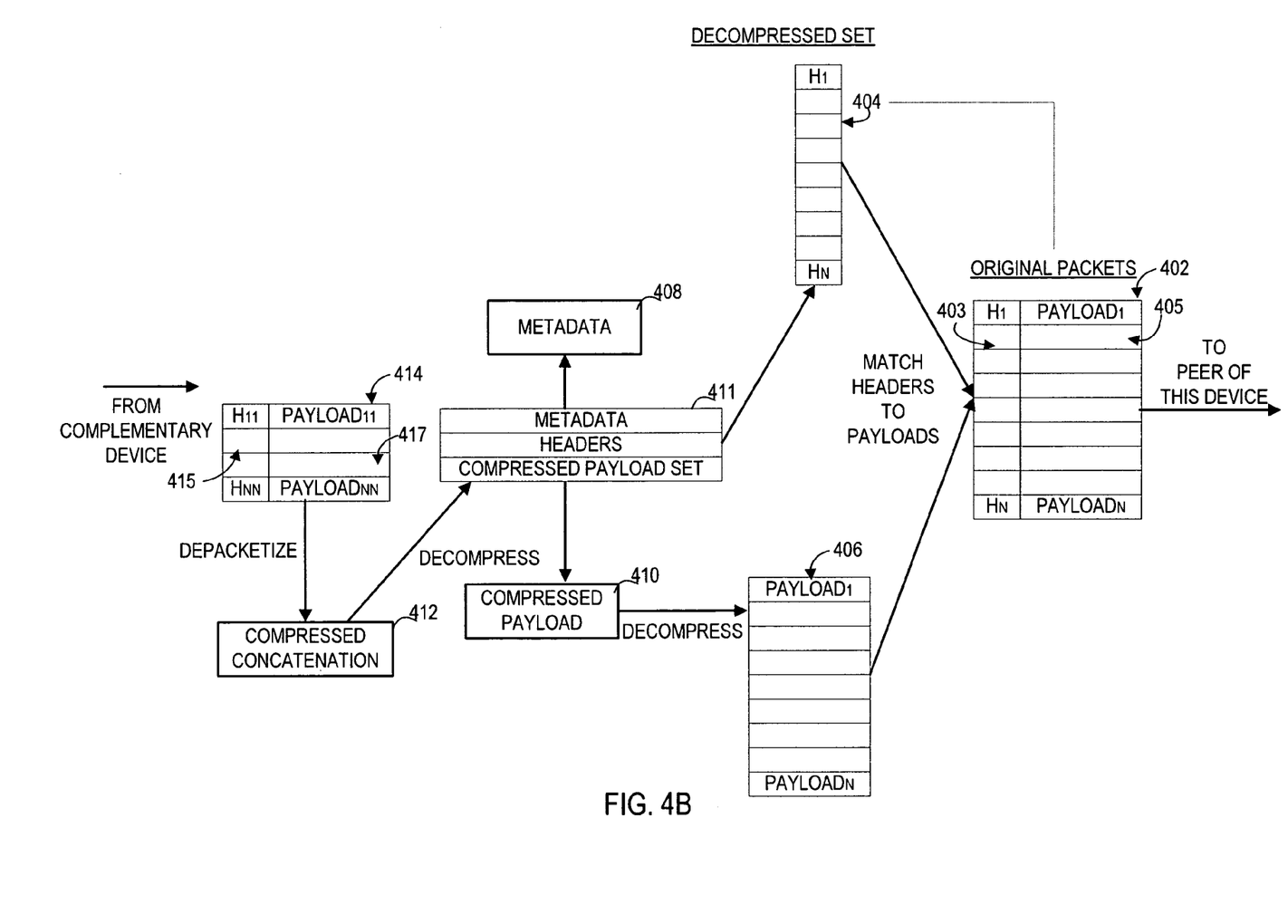
FIG. 4B shows the progression of a set of contiguous data packets of a single communication session between endpoints from being received in a compressed state to being decompressed and injected in their original form into an outgoing stream of the single communication session.

FIG. 4B shows the stages of the data packets and segments thereof as they progress through the reception, decompression, and reconstruction phase according to one illustrative embodiment. Initially, the set of tunnel packets 414 are received from the sending compression device. Then each tunnel packet of the set of tunnel packets 414 is depacketized to reproduce the compressed data set 412. For embodiments such as this one where the concatenated set 411 has been compressed to produce the compressed data set 412, the compressed data set 412 is then decompressed by the decompressor engine 152 to produce the set of headers 404, metadata 408, and the compressed payload data set 410. The compressed payload data set 410 is then provided as at least one single decompressible buffer to the decompressor engine 152 where it is decompressed to produce the set of payloads 406.

These decompressed set of headers 404, set of payloads 406, and metadata 408 are then provided to the scatter engine 139. The scatter engine 139 then follows the lengths and order specified in the metadata 408 to match each header of the set of headers 404 to its corresponding payload of the set of payloads 406. The scatter engine 139 may also add any additional data such as the Ethernet headers and IPSec ESP padding, which is not transmitted but is already known to the scatter engine 139, to thereby reconstruct the set of contiguous data packets 402 including each header 403 and each corresponding payload 405. The scatter engine 139 then injects each individual data packet of the set of contiguous data packets 402 into the end-to-end stream to the peer device that is local to the receiving packet compression device.

Although the subject matter above has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At a packet processing device, the packet processing device including a processor and system memory, the packet processing device connected to one or more computer systems on a local network, the packet processing device also connected to a wide area network, a method of compressing data packets for transmission in a communication session method comprising:
    receiving a plurality of data packets sent from a computer system, the computer system selected from among the one or more computer systems, the plurality of data packets included in an established communication session between the computer system and an endpoint location on the wide area network, each of the plurality of packets addressed to the endpoint location on the wide area network, each of the plurality of packets including a header and a payload;
    identifying a set of contiguous data packets from among the plurality of received data packets, the set of contiguous data packets being less than all of the plurality of received packets such that the plurality of received data packets includes other remaining data packets;
    for the set of contiguous data packets, separating the headers from the payloads to form a set of headers and a set of payloads;
    compressing the set of payloads into a compressed payload data set;
    concatenating the set of headers with the compressed payload data set to form a concatenated data set;
    packetizing the concatenated data set into a further set of data packets, the further set of data packets for transmission to a complementary packet processing device via another different communication session, the complementary packet processing device connected to the wide area network and connected to the endpoint location; and
    transmitting the further set of data packets via the other communication session to the complementary packet processing device.

2. The method of claim 1, further comprising:
    transmitting at least some of the other remaining packets to the endpoint location via the established communication session between the computer system and the endpoint location.

3. The method of claim 1, wherein identifying a set of contiguous data packets from among the plurality of received data packets comprises identifying a set of contiguous data packets that are eligible for compression based on a protocol associated with the set of contiguous data packets.

4. The method of claim 1, further comprising grouping the set of payloads into the single compressible buffer prior to compressing the set of payloads.

5. The method of claim 1, further comprising compressing the concatenated data set, including the set of headers and the compressed payload data set, into a compressed data set prior to packetizing; and
    wherein packetizing the concatenated data set comprises packetizing the compressed data set.

6. The method of claim 3, wherein identifying a set of contiguous data packets that are eligible for compression based on a protocol associated with the set of contiguous data packets comprises:
    determining whether any data packets of the established communication session include a security header;
    if a data packet of the established communication session includes a security header, then determining whether the data packet with the security header is an encrypted data packet or an authenticated data packet; and if the data packet is determined to be an authenticated data packet, then including the data packet in the first set and if the data packet is determined to be an encrypted data packet, then forwarding the data packet through the first communication session between endpoints without compressing.

7. The method of claim 6, wherein determining whether any of the received data packets includes a security header comprises detecting whether the packet is an IPSec ESP packet and when the packet is an IPSec ESP packet, then determining whether the IPSec ESP packet is an encrypted packet or an authenticated packet by attempting to validate the packet using an assumed IPSec ESP signature size.

8. The method of claim 1, wherein concatenating the set of headers with the compressed payload data set to form a concatenated data set comprises concatenating metadata and the set of headers with the compressed payload data set to from the concatenated data set, the metadata specifying the lengths and order of each of the headers and payloads.

9. The method of claim 1, further comprising:
accessing a Quality-of-Service (QoS) marking from a header corresponding to one of the set of contiguous data packets, the Quality-of-Service (QoS) marking indicating a Quality-of-Service (QoS) priority for the established communication session; and
transferring Quality-of-Service (QoS) priority for established communication session to the other different communication session by marking the further set of packets with the Quality-of-Service (QoS) marking to specifying that the other different communication session also has the Quality-of-Service (QoS) priority indicated for the established communication session.

10. At a packet processing device, the packet processing device including a processor and system memory, the packet processing device connected to one or more computer systems on a local network, the packet processing device also connected to a wide area network, a method for decompressing packets received for a communication session, the method comprising:
receiving a set of data packets via a communication session with a complementary packet processing device, the complementary packet processing device connected to the wide area network, the set of data packets encapsulating a concatenated compressed data set including a set of headers concatenated with a compressed payload data set, the compressed payload data set including payloads corresponding to the set of headers, the payloads having been separated from the set of headers for compression at the complementary packet processing device, the set of headers and corresponding payloads for a computer system selected from among the one or more computer systems, the set of headers and corresponding payloads representing a set of contiguous data packets sent from an endpoint location on the wide area network to the computer system via another different established communication session between the computer system and the endpoint location;
depacketizing the received set of data packets into the compressed concatenated data set including the set of headers and the compressed payload data;
decompressing the compressed payload data set to reveal the corresponding payloads;
reconstructing the set of contiguous data packets by matching headers from the set of headers with corresponding payloads; and
injecting the reconstructed set of contiguous data packets into a plurality of other data packets being sent to the computer system via the other different communication session, the set of contiguous data packets injected in an appropriate order so that the set of contiguous data packets is appropriately streamed along with the plurality of other packets to the computer system.

11. The method of claim 10, further comprising prior to decompressing the compressed payload data set decompressing the compressed concatenated data set to reveal the set of headers and the compressed payload data set.

12. The method of claim 10, wherein receiving a set of data packets comprises receiving a set of data packets including metadata and the set of headers concatenated with the compressed payload data set, the metadata specifying a sequential ordering within the plurality of other data packets being sent via the other different communication session and wherein reconstructing the set of contiguous data packets comprises obtaining headers and payloads in accordance with the metadata.

13. The method of claim 10, wherein injecting the reconstructed set of contiguous data packets into a plurality of other data packets comprises injecting the reconstructed set of contiguous data packets into the plurality of other data packets in accordance with the sequential ordering specified in the metadata.

14. A device for processing data packets, comprising:
one or more processors;
system memory;
at least one network connector;
one or more computer storage devices having stored there on computer-executable instructions representing a gather engine, a compression engine, and a transmission engine, the gather engine executed by a processor configured to:
receive a plurality of data packets sent from a computer system, the computer system selected from among one or more computer systems on a local area network with the device, the plurality of data packets included in an established communication session between the computer system and an endpoint location on a wide area network, each of the plurality of packets addressed to the endpoint location on the wide area network, each of the plurality of packets including a header and a payload;
identify a set of contiguous data packets from among the plurality of received data packets, the set of contiguous data packets being less than all of the plurality of received packets such that the plurality of received data packets includes other remaining data packets;
for the set of contiguous data packets, separate the headers from the payloads to form a set of headers and a set of payloads; are
the compression engine executed by a processor configured to:
compress the set of payloads to create a compressed a load data set; and
concatenate the set of headers with the compressed payload data set to form a concatenated data set; and
the transmission engine executed by a processor configured to:
packetize the concatenated data set into a further set of data packets, the further set of data packets for transmission to a complementary packet processing device via another different communication session, the complementary packet processing device connected to the wide area network and connected to the endpoint location; and transmit the further set of data packets via the other communication session to the complementary packet processing device.

15. The device of claim 14, further comprising:

the one or more computer storage devices having further stored there on computer-executable instructions representing a receiver engine, a decompression engine, and a scatter engine, the receiver engine executed by a processor configured to:

receive a set of data packets via a further communication session with another complementary packet processing device, the other complementary packet processing device connected to the wide area network, the set of data packets encapsulating a concatenated compressed data set including a set of headers concatenated with a compressed payload data set, the compressed payload data set including payloads corresponding to the set of headers, the payloads having been separated from the set of headers for compression at the other complementary packet processing device, the set of headers and corresponding payloads for another computer system connected to the local area network, the set of headers and corresponding payloads representing a set of contiguous data packets sent from another endpoint location on the wide area network to the computer system via an additional different established communication session between the computer system and the other endpoint location; and depacketize the received set of data packets into the compressed concatenated data set including the set of headers the compressed payload data; and the decompression engine executed by a processor configured to decompress the compressed payload data set to reveal the corresponding payloads; and the scatter engine executed by a processor configured to:

reconstruct the set of contiguous data packets by matching headers from the set of headers with corresponding payloads; and inject the reconstructed set of contiguous data packets into a plurality of other data packets being sent to the computer system via the additional different communication session, the set of contiguous data packets injected in an appropriate order so that the set of contiguous data packets is appropriately streamed along with the plurality of other packets to the computer system.

16. The device of claim 14, wherein the gather engine executed by a processor is configured to identify a set of contiguous data packets from among the plurality of received data packets by be configured to:

determine whether any of the plurality of packets include a security header;

if an incoming data packet includes a security header, then determine whether the incoming data packet with the security header is an encrypted packet or an authenticated packet; and include authenticated data packets in the set of contiguous packets while passing through without compressing the encrypted data packets.

17. The device of claim 16, wherein the gather engine executed by a processor being configured to determine whether any of the incoming data packets include a security header comprises the gather engine being configured to detect whether a packet is an IPSec ESP packet and when the packet is an IPSec ESP packet, then the gather engine determines whether the IPSec ESP packet is an encrypted packet or an authenticated packet by attempting to validate the packet using an assumed IPSec ESP signature size.

18. The device of claim 14, wherein the gather engine executed by a processor being configured to identify a set of contiguous packets comprises the gather engine being configured to gather incoming data packets into the f4r-st-set of contiguous data packets by analyzing each data packet to detect whether the packet is a transmission control protocol packet.

19. The device of claim 14, wherein the gather engine executed by a processor is further configured to: access a Quality-of-Service (QoS) marking from a header corresponding to one of the set of contiguous data packets, the Quality-of-Service (QoS) marking indicating a Quality-of-Service (QoS) priority for the established communication session: and transfer Quality-of-Service (QoS) priority for established communication session to the other different communication session by marking the further set of packets with the Quality-of-Service (QoS) marking to specify that the other communication session has the Quality-of-Service (QoS) priority indicated for the established communication session.

* * * * *